(12) United States Patent
Fesas, Jr.

(10) Patent No.: US 6,397,316 B2
(45) Date of Patent: *May 28, 2002

(54) SYSTEM FOR REDUCING BUS OVERHEAD FOR COMMUNICATION WITH A NETWORK INTERFACE

(75) Inventor: Nestor A. Fesas, Jr., Austin, TX (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/899,435

(22) Filed: Jul. 24, 1997

(51) Int. Cl.[7] .............................................. G06F 12/10
(52) U.S. Cl. ...................................... 711/200; 711/207
(58) Field of Search ................................ 370/231, 278, 370/352, 392, 353, 401, 413, 427, 437, 380, 463, 419, 420; 711/170, 171, 172, 200, 202, 203, 204, 205, 206, 207, 208

(56) References Cited

U.S. PATENT DOCUMENTS

| | | | | |
|---|---|---|---|---|
| 4,419,728 A | | 12/1983 | Larson | 364/200 |
| 4,888,691 A | | 12/1989 | George et al. | 364/300 |
| 5,315,708 A | * | 5/1994 | Eidler et al. | 395/250 |
| 5,522,050 A | | 5/1996 | Amini et al. | 395/306 |
| 5,737,634 A | * | 4/1998 | Hamano et al. | 395/847 |
| 5,893,926 A | * | 4/1999 | Saxena et al. | 711/170 |
| 5,937,436 A | * | 8/1999 | Watkins | 711/202 |
| 5,983,332 A | * | 11/1999 | Watkins | 711/202 |
| 6,049,857 A | * | 4/2000 | Watkins | 711/207 |

* cited by examiner

*Primary Examiner*—Ajit Patel
(74) *Attorney, Agent, or Firm*—Blakely, Sokoloff Taylor & Zafman LLP

(57) ABSTRACT

The present invention provides a method and an apparatus for transferring data between a computer system and a network interface card that avoids virtual-to-physical address translations. The computer system allocates blocks of memory during system initialization for storing data in transit between the computer system and the NIC, and the physical addresses of these blocks of memory are stored in a table on the NIC. Consequently, address conversion is performed only once, when the memory is allocated. When a request to transfer data to the NIC is received from the upper layers, the device driver copies the data from the upper layers into the next available memory block. The device driver then formats a command and passes it to the NIC for processing. Data transfer commands are communicated to the NIC through a packet descriptor command (PDC), which is a 32-bit value subdivided into fields that completely describe the data transfer operation. The PDC contains a small ordinal value that indexes a table in the NIC, which includes a set of physical addresses of buffers preallocated by the computer system in the computer system memory. These buffers are used for storing data in transit to the NIC. The PDC also contains the length of the buffer to be copied to or from the NIC. The present invention also allows for multiple packets to be formatted into buffers and then subsequently transferred to the NIC in a single I/O operation.

30 Claims, 5 Drawing Sheets

| STATUS 200 | NUMBER OF FRAGMENTS 210 | PACKET LENGTH 220 |
|---|---|---|
| 230 ADDRESS OF FRAGMENT 1 ||| 
| 235 LENGTH OF FRAGMENT 1 |||
| 240 ADDRESS OF FRAGMENT 2 |||
| 245 LENGTH OF FRAGMENT 2 |||
| ⋮ |||
| 250 ADDRESS OF FRAGMENT N |||
| 255 LENGTH OF FRAGMENT N |||

| OPTIONS 300 | BLOCK INDEX 310 | BUFFER LENGTH 320 |
FIG. 3
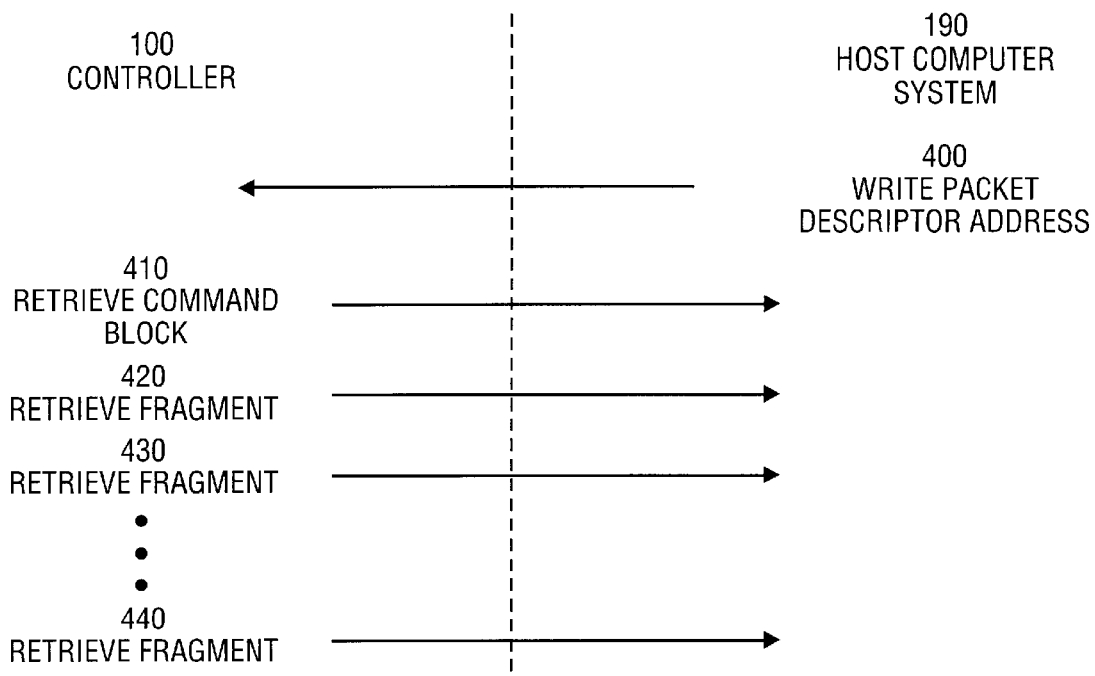
FIG. 4
(PRIOR ART)
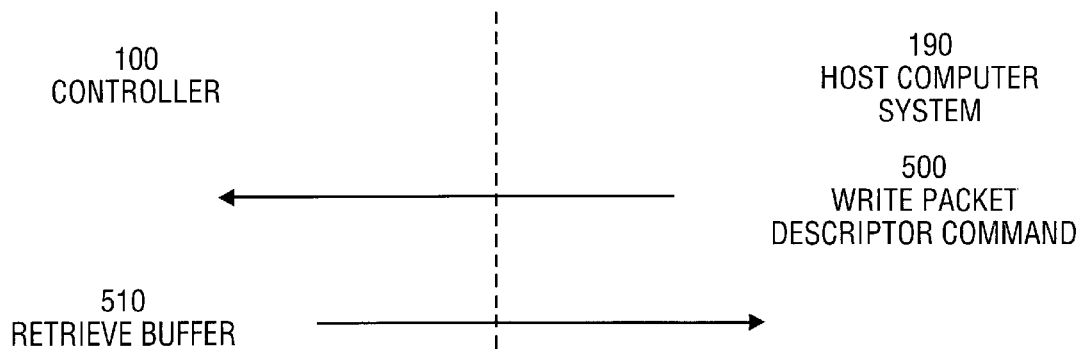
FIG. 5

SYSTEM FOR REDUCING BUS OVERHEAD FOR COMMUNICATION WITH A NETWORK INTERFACE

BACKGROUND

1. Field of the Invention

The present invention relates to a device for connecting a computer system to a computer network, and more particularly to a method and an apparatus for reducing bus overhead in communications between a computer system and a network interface device through which the computer system communicates with a high speed packet-switched network.

2. Related Art

The advent of computer networking has given rise to devices that connect computer systems to packet-switched data networks. These devices (known as network interface controllers, or NICs) typically include interfaces to both the computer system and the packet-switched data network, as well as a buffer memory for buffering packets of data in transit between the computer system and the packet-switched data network. The interface to the computer system typically connects to a bus within the computer system, such as a PCI bus, through which data is transferred between the computer system memory and the NIC. As computer networks and NICs greatly increase in performance, communications across this bus can become an impediment to achieving high performance in communications between the computer system and the packet-switched data network.

Three methods can be used to communicate between a computer system and a device such as a NIC. (1) Programmed I/O (PIO) operates by including explicit I/O commands in the application programs executed by the computer system. PIO can be implemented with a simple hardware and operating system design. However, it places a tremendous burden on the application program to explicitly manage communications between the computer system and the NIC. (2) Shared memory can be used to facilitate communications between the NIC and the computer system. In a shared memory system, the NIC and the computer system communicate by writing to and reading from a shared memory that exists in both the address space of the computer system and the address space of the NIC. This again leads to a simple hardware and operating system implementation, and a clean interface between the computer system and the NIC. However, it again places a burden on the application program to explicitly manage communications between the computer system and the NIC. (3) Finally, direct memory access (DMA) can be used to transfer data between the NIC and the memory of the computer system. DMA operates by allowing the NIC to perform bus operations to directly access the memory of the computer system in order to transfer data between the computer system and the NIC. A DMA system requires considerable complexity in hardware and operating system design. However, it relieves the application program of the burden of explicitly managing communications between the computer system and the NIC.

DMA transfers between computer systems and NICs are commonly accomplished using the scatter-gather technique. In scatter-gather, a bus master device in the NIC is first instructed to obtain a command block from the memory of a host computer system. At a minimum, the command block contains a list of physical addresses for blocks within the host system memory that are to be copied to the DMA device. The command block also contains a count of the number of fragments in the command block and the overall length of the data contained in the fragments pointed to by the command block. The DMA device parses the command block, extracting the address of each fragment, and transfers the fragments from the host memory to the DMA device. This process is repeated for each fragment listed in the command block until all of the data described by the command block is copied to the DMA device.

A significant performance bottleneck in using the scatter-gather technique for transferring data to a high speed network is the translation from virtual to physical addresses. Peripheral devices, such as a NIC, cannot use virtual memory addresses to effect the transfers, because the hardware to implement the virtual-to-physical address translation is typically located inside the CPU. This means that conversion between virtual and physical addresses must take place before transfers between a computer system and a NIC can take place. This conversion can take a great deal of time and consume a significant amount of the computer system's processing power. When data is passed to a device driver for transmission to the NIC, the driver first performs a virtual-to-physical address conversion for each buffer fragment passed down to it from the application layers above. It is possible for each buffer fragment to straddle physical pages of the memory system. Thus, more than one physical address may correspond to each virtual address converted. Consequently, several virtual-to-physical address conversions may be required for each buffer of data that is transferred from the computer system to the NIC. This can be very time-consuming because each virtual-to-physical address translation can take from tens to hundreds of CPU cycles to accomplish.

Another significant performance impediment associated with the scatter-gather technique is its command block nature. Peripheral devices such as NICs typically connect to computer systems through a peripheral interconnect bus, such as the PCI bus. In order to transfer data to or from the computer system, devices connected to the bus contend for control of the bus. Once a device is granted control of the bus, it drives bus signal lines to transfer data to or from the computer system. The performance impediment stems from the number of times a NIC must contend for the peripheral interconnect bus when transferring data using the scatter-gather technique. Under ideal circumstances for scatter-gather, bus contention to transfer data between a NIC and an attached computer system will occur three times per buffer transferred: first, when the computer system informs the NIC that a buffer is available for its use; second when the NIC reads the command block describing the buffer; and third when the NIC transfers data to or from the buffer. In typical scenarios, at least two buffer fragments will be described in each command block. As a result, there will be at least four contentions instead of three. These additional contentions create opportunities for other devices to obtain control of the bus and thus delay transfers initiated by the NIC.

What is needed is a method for performing DMA between a computer system and a NIC which is free from the overhead of performing virtual to physical address translations and minimizes the number of bus transactions required to initiate the DMA transfer process.

SUMMARY

The present invention provides a method and an apparatus for transferring data between a computer system and a network interface card that avoids virtual-to-physical address translations. The computer system allocates blocks of memory during system initialization for storing data in transit between the computer system and the NIC, and the physical addresses of these blocks of memory are stored in a table on the NIC. Consequently, address conversion is performed only once, when the memory is allocated. When a request to transfer data to the NIC is received from the upper layers, the device driver copies the data from the upper layers into the next available memory block. The device driver then formats a command and passes it to the NIC for processing. Data transfer commands are communicated to the NIC through a packet descriptor command (PDC), which is a 32-bit value subdivided into fields that completely describe the data transfer operation. The PDC contains a small ordinal value that indexes a table in the NIC, which includes a set of physical addresses of buffers preallocated by the computer system in the computer system memory. These buffers are used for storing data in transit to the NIC. The PDC also contains the length of the buffer to be copied to or from the NIC. The present invention also allows for multiple packets to be formatted into buffers and then subsequently transferred to the NIC in a single I/O operation.

The present invention provides a number of advantages. First, virtual-to-physical address translation is avoided at run time. Second, the formatting of a packet descriptor list is greatly simplified. Third, the amount of control data transferred to the NIC by the computer system is greatly reduced. Finally, multiple packets can be transferred to the NIC in a single I/O operation, thereby making more efficient use of bandwidth on the interconnect bus.

The present invention incurs additional overhead because the processor must move data from the application program into the data buffers in the computer system's memory before this data is transferred to the NIC. At first glance, this double copy operation appears to incur a great amount of additional processor overhead. However, this additional overhead is considerably smaller than the overhead involved in performing virtual-to-physical address translations. Each translation requires many tens (if not hundreds) of CPU cycles, and many such translations may be required for a single transfer operation. Consequently, the present invention provides a significant performance advantage for small data transfers, which represent a significant percentage of all data transfers. Hundreds of bytes can be moved to the preallocated buffer in the time it takes to perform just one virtual-to-physical address translation. Moreover, as microprocessors move to 64 and 128 bit architectures, their capacity to move data per clock will increase thereby further widening the performance advantage of the present invention over conventional scatter-gather DMA.

Furthermore, CPU utilization may not be the primary bottleneck. In systems which move around large amounts of data, bus utilization may be the largest bottleneck. Hence, favoring bus utilization at the expense of CPU utilization is often a desirable tradeoff to make.

Thus, the present invention can be characterized as an apparatus for facilitating communications between a computer system, including a memory and a bus, and a packet-switched network, comprising: a bus interface coupled to the bus, for communicating across the bus; a transmit buffer, for storing data to be transmitted on the packet-switched network; a transmit data path, coupled to the bus interface and the transmit buffer, for transferring data from the bus interface to the transmit buffer; a receive buffer, for storing data received from the packet-switched network; a receive data path, coupled to the bus interface and the receive buffer, for transferring data from the receive buffer to the bus interface; a buffer address table, coupled to the bus interface, for storing at least one address of at least one buffer in the memory of the computer system, the at least one buffer being preallocated by the computer system and used to store data in transit between the computer system and one of the transmit buffer and the receive buffer; and a controller coupled to the transmit buffer, the receive buffer and the buffer address table, for controlling the transfer of data from the computer system to the transmit buffer, and from the receive buffer to the computer system.

According to an aspect of the present invention, the apparatus includes: a transmit command queue coupled to the bus interface and the controller, for storing transmit commands from the computer system; and a transmit execution queue, coupled to the bus interface, the transmit command queue and the controller, for storing and processing commands from the transmit command queue, and command blocks from the computer system which are referenced by commands from the transmit command queue.

According to another aspect of the present invention, the apparatus includes a receive command queue coupled to the bus interface and the controller, for storing receive commands from the computer system; and a receive execution queue, coupled to the bus interface, the receive command queue and the controller, for storing and processing commands from the receive command queue and command blocks from the computer system that are referenced by commands from the receive command queue.

According to another aspect of the present invention, the controller includes a mechanism to transfer a plurality of packets in a single operation between the at least one buffer preallocated by the computer system and the transmit buffer.

According to another aspect of the present invention, the controller includes a mechanism to transfer a plurality of packets in a single operation between the receive buffer and the at least one buffer preallocated by the computer system.

The present invention can also be characterized as a method for transferring data between a computer system and a network interface device, the network interface device being coupled to a packet-switched network, and the computer system including a memory and a communication channel, the communication channel being coupled to the network interface device, the method comprising: receiving at the network interface device at least one address of a preallocated buffer in the memory; storing in the network interface device the at least one address of the preallocated buffer; receiving a command from the computer system through the communication channel, the command indicating that a transfer between the network interface device and the computer system is to take place; retrieving an address from the at least one address of a preallocated buffer stored in the network interface device; using the address to transfer data from the preallocated buffer in the memory to the network interface device if the command is a transmit command; and using the address to transfer data from the network interface device to the preallocated buffer in the memory if the command is a receive command.

DESCRIPTION OF THE FIGURES

FIG. 3 is a block diagram illustrating the structure of a simplified packet descriptor command for initiating a transfer of data between a NIC and a computer system in accordance with an aspect of the present invention.

FIG. 4 is a diagram illustrating the sequence of commands and data transfers involved in transferring data from host computer system 190 to a NIC in accordance with an aspect of the present invention.

FIG. 5 is a diagram illustrating the sequence of commands and data transfers involved in transferring data from host computer system 150 to a NIC in accordance with an aspect of the present invention.

DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figures 1, 2:
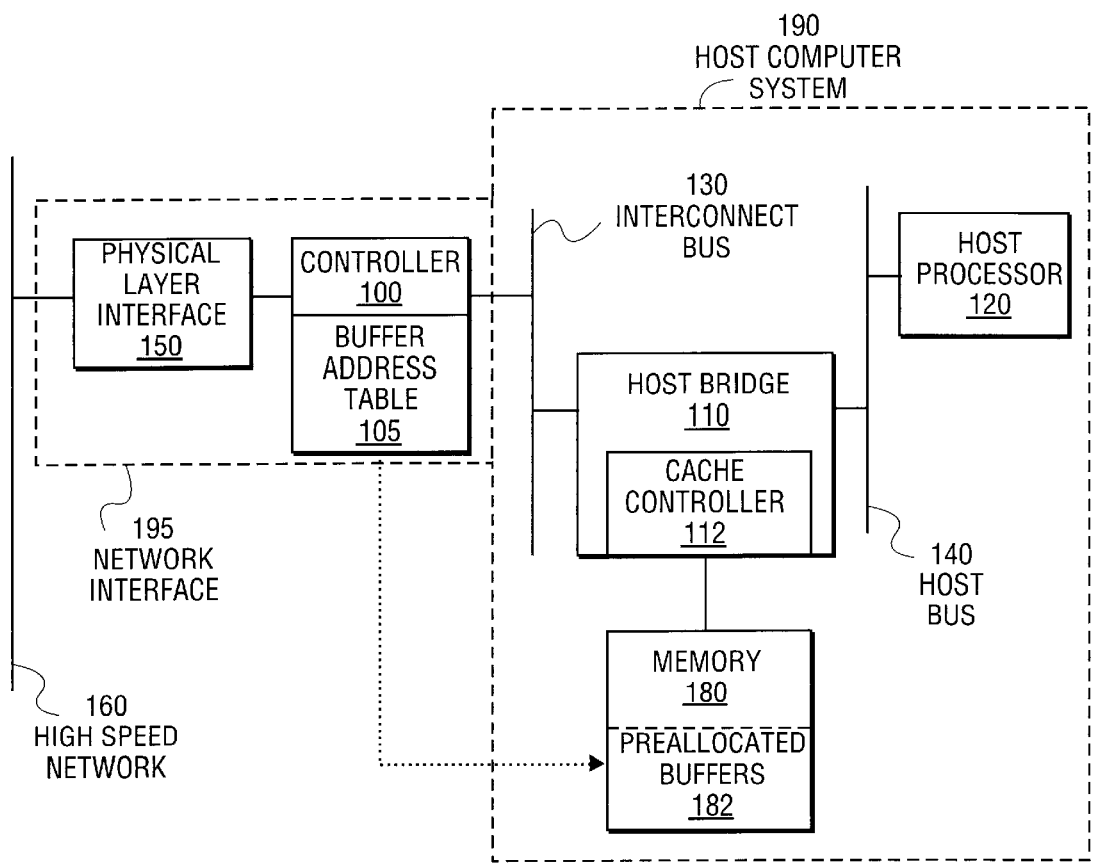
FIG. 1 is a block diagram illustrating some of the major functional components of a system for coupling host computer system 190 with a high speed network 160 in accordance with an aspect of the present invention.
FIG. 2 is a block diagram illustrating the format of a packet descriptor list in accordance with an aspect of the present invention.

FIG. 1 is a block diagram illustrating some of the major functional components of a host computer system 190, which connects to a high speed network 160 through network interface 195, in accordance with an aspect of the present invention. Host computer system 190 includes interconnect bus 130, host bridge 110, host bus 140, host processor 120 and memory 180. Host processor 120 connects to host bus 140, which also connects to host bridge 110. Host processor 120 can be any type of processor system including a device controller, a microprocessor, or a mainframe computing system. Host bus 140 is a bus which connects host processor 120 to host bridge 110. Host bridge 110 includes cache controller 112 which connects to memory 180. Memory 180 includes pre-allocated buffers 182, which are buffers preallocated by host processor 120 during system initialization. These buffers are used to store data in transit between host computer system 190 and high speed network 160. Host bridge 110 additionally connects to interconnect bus 130. Interconnect bus 130 is used to connect host computer system 190 to peripheral devices, such as network interface 195. Interconnect bus 130 may be any type of commonly used interconnection bus, such as a PCI bus.

High speed network 160 is any type of high speed data network, including 100 megabit and gigabit Ethernet networks for example. Network interface 195 may be implemented on a separate computer card, or it may be integrated into a computer system motherboard. It may also be integrated into a single silicon chip. Network interface 195 includes physical layer interface 150 and controller 100. Controller 100 is coupled to interconnect bus 130 within host computer system 190. Controller 100 additionally connects to physical layer interface 150, which connects to high speed network 160. Controller 100 performs the DMA functions involved in transferring data between memory 180 within host computer system 190, and high speed network 160. Controller 100 includes buffer address table 105, which includes a plurality of addresses of buffers in preallocated buffers 182 within memory 180. Physical layer interface 150 includes resources for performing communications across high speed network 160.

FIG. 2 is a diagram illustrating the structure of a packet descriptor list (PDL) in accordance with an aspect of the present invention. The PDL illustrated in FIG. 2 specifies a transmission of data including the transmission of N separate fragments scattered through memory 180 within host computer system 190. The PDL includes status field 200, which contains information regarding the status of the data transfer corresponding to the PDL. It also includes a number of fragments field 210, which indicates the number of fragments associated with the data transfer specified by the PDL. The PDL also includes a packet length 220, which indicates the length of the entire transfer, including the plurality of associated fragments. The PDL additionally includes a number of address/length pairs. Address of fragment 1 230 includes the physical address for fragment 1 within memory 180 of host computer system 190. Length of fragment 1 235 includes the length of fragment 1. Address of fragment 2 240 includes the address within memory 180 of fragment 2. Length of fragment 2 245 includes the length of fragment 2. Next, there are a number of intervening fragments, and then address of fragment N 250, which contains the address of fragment N within memory 180. The PDL additionally contains length of fragment N 255, which includes the length of fragment N.

FIG. 3 illustrates the format for a simplified command sent from host computer system 190 to network interface 195 in accordance with an aspect of the present invention. The command is known as a packet description command (PDC) and fits within a single word of memory. It includes options field 300, which is a field indicating the processing options for a transmission between host computer system 190 and network interface 195. It also includes block index field 310, which indexes a buffer address table within controller 100, containing the physical address of a preallocated buffer within memory 180 in host computer system 190. Finally, it includes buffer length 320, which is the length of the data within the pre-allocated buffer that is to be transferred between network interface 195 and host computer system 190. Note that this simplified command format does not require a "number of fragments" field because only one fragment is sent. It also does not require a separate address and length for each fragment because multiple fragments are concatenated together within a single pre-allocated buffer to be transferred in a single operation.

FIG. 4 illustrates the sequence of operations involved in transferring data from host computer system 190 to controller 100 within network interface 195 using a prior art packet descriptor list command format in accordance with an aspect of the present invention. First, host computer system 190 writes a packet descriptor address to controller 100. Next, controller 100 uses this packet descriptor address to retrieve a command block 410 from host computer system 190. Once this command block is retrieved, controller 100 performs a series of retrieval operations 420, 430 and 440, to retrieve individual fragments from host computer system 190 into controller 100.

FIG. 5 illustrates the sequence of operations required to move data from host computer system 190 to controller 100 using a packet descriptor command format in accordance with an aspect of the present invention. The greatly simplified sequence of operations in this example results from the simplified command format and the preallocation of buffers within memory 180. First, host computer system 190 writes a packet descriptor command 500 to controller 100. Controller 100 uses the block index 310 within this packet descriptor command as well as buffer length 320 to retrieve a buffer 510 within memory 180.

Figure 6:
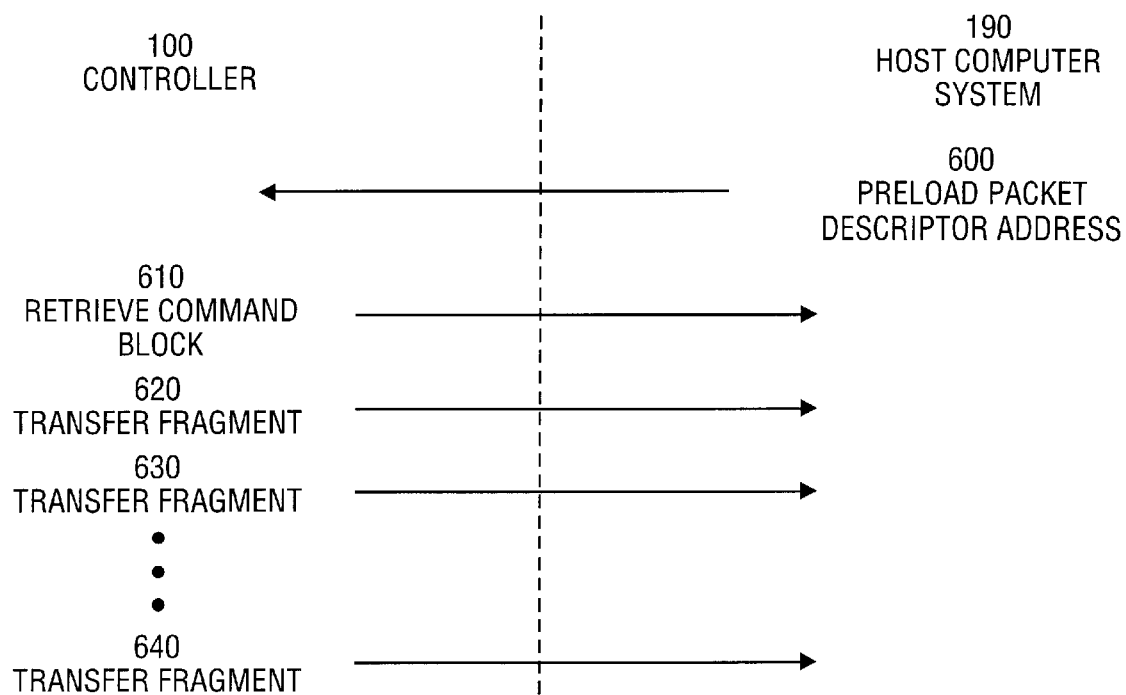
FIG. 6 illustrates the sequence of commands and data transfers involved in transferring data from a NIC to a host computer system 150 in accordance with an aspect of the present invention.

FIG. 6 illustrates the sequence of operations required to transfer data from controller 100 to host computer system 190 using a prior art packet descriptor list command format in accordance with an aspect of the present invention. First, a packet descriptor address is pre-loaded 600 into controller 100 sometime before the incoming data is received at controller 100 from high speed network 160. Next, the packet descriptor address is used to retrieve a command block 610, including a packet descriptor list from host computer system 190. Next, when the incoming data is received from high speed network 160, a series of transfers, 620, 630 and 640, take place between controller 100 and host computer system 190 to transfer all of the constituent fragments to host computer system 190.

Figure 7:
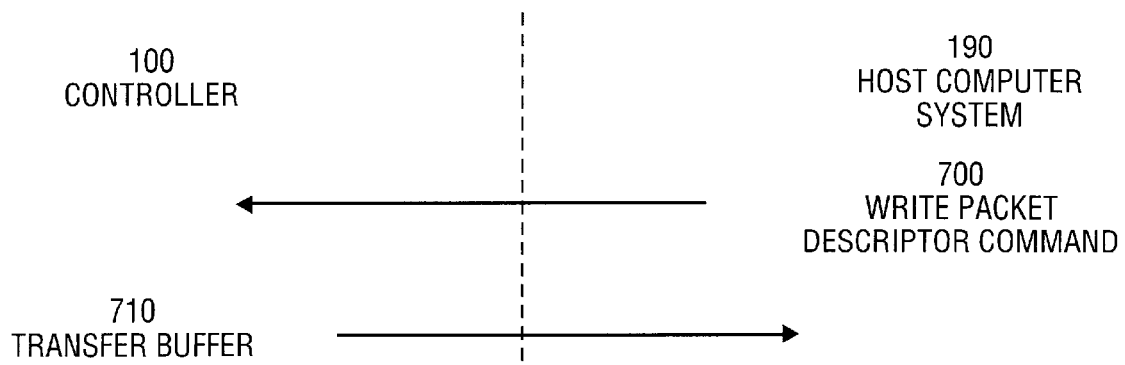
FIG. 7 is a diagram illustrating the sequence of commands and data transfers involved in transferring data from a NIC to a host computer system 150 in accordance with an aspect of the present invention.

In contrast, FIG. 7 presents a greatly simplified series of transactions required to move data from controller 100 to host computer system 190 using a packet descriptor command format in accordance with an aspect of the present invention. First, a packet descriptor command is preloaded 700 into controller 100 from host computer system 190 before data is received at controller 100. Next, when data is finally received at controller 100 from high speed network 160, this data is transferred to a buffer within host computer system 190 in a single transaction.

Although optimum performance is attained when the packet descriptor command 700 is preloaded into controller 100, this sequence is not a requirement. Controller 100 can buffer data until such time that host computer system 190 loads a packet descriptor command into controller 100.

Figure 8:
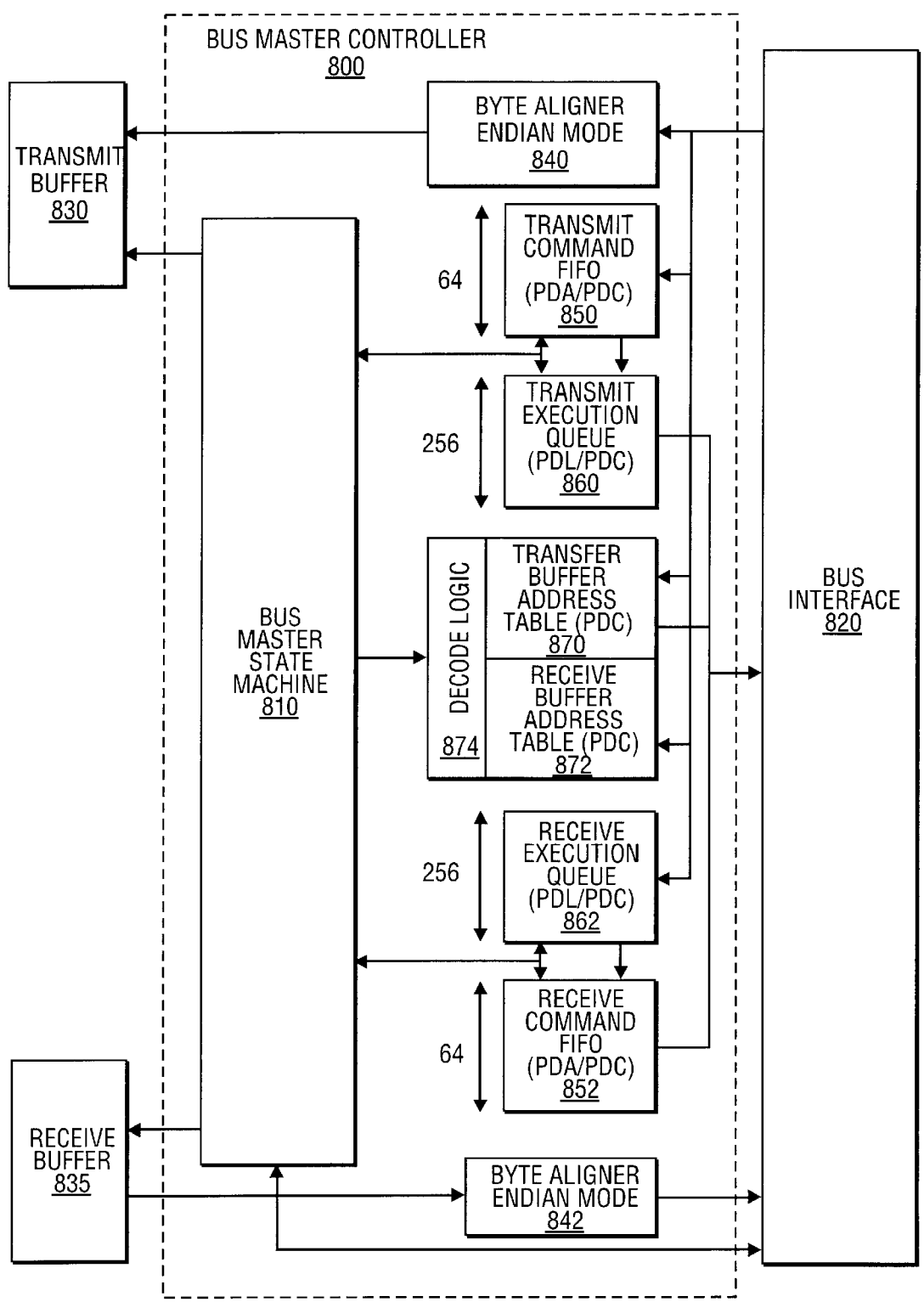
FIG. 8 is a block diagram illustrating some of the major functional components within a NIC in accordance with an aspect of the present invention.

FIG. 8 is a block diagram illustrating some of the major functional components of controller 100 in FIG. 1 in accordance with an aspect of the present invention. Controller 100 includes bus master controller 800, which is coupled to transmit buffer 830 and receive buffer 835. Transmit buffer 830 and receive buffer 835 are used to store data to be transmitted and received from high speed network 160 pictured in FIG. 1. Bus master controller 800 additionally connects to bus interface 820, which implements bus interface functions for a connection onto interconnect bus 130 within host computer system 190 in FIG. 1. Bus master controller 800 includes transmit command FIFO 850, which stores transmit commands from host computer system 190. Transmit command FIFO 850 is coupled to transmit execution queue 860. Transmit execution queue 860 contains expanded commands from transmit command FIFO 850. If the command in transmit command FIFO 850 is a packet descriptor address, the corresponding command block is retrieved and placed into transmit execution queue 860. If the command is a packet descriptor command, the command is directly transferred to transmit execution queue 860. Transmit execution queue 860 is additionally coupled to transmit buffer address table 870, which contains physical addresses of preallocated buffers within memory 180 in host computer system 190.

Bus master controller 800 additionally includes receive command FIFO 852, which contains receive commands from host computer system 190 that are preloaded into receive command FIFO 852. Receive command FIFO 852 is coupled to receive execution queue 862, which contains expanded commands from receive command FIFO 852. Again, packet descriptor addresses within receive command FIFO 852 are expanded into corresponding command blocks which are loaded into receive execution queue 862. Packet descriptor commands are directly loaded into receive execution queue 862. Bus master controller 800 also includes receive buffer address table 872, which contains a table of physical addresses of pre-allocated buffers for storing data received from high speed network 160.

Bus master controller 800 additionally includes byte aligner endian mode circuitry 840 and byte aligner endian mode circuitry 842. Byte aligner endian mode circuitry 840 is coupled between bus interface 820 and transmit buffer 830. It performs byte alignment and endian mode reversal functions for control information associated with data transmissions from bus interface 820 to transmit buffer 830. Byte aligner and endian mode circuitry 842 is coupled between receive buffer 835 and bus interface 820, and provides the same byte alignment and endian mode reversal functions for status information associated with data transmitted from receive buffer 835 and bus interface 820 in accordance with an aspect of the present invention.

Bus master controller 800 additionally includes bus master state machine 810, which is coupled to all of the functional components within bus master controller 800, and is additionally coupled to bus interface 820, transmit buffer 830 and receive buffer 835. Bus master state machine 810 coordinates actions of the components within FIG. 8 to transfer data between bus interface 820 and transmit and receive buffers 830 and 835.

Bus master controller 800 is responsible for data flow between transmit buffer 830, receive buffer 835 and bus interface 820. It includes five major components: bus master state machine 810, byte aligner endian mode circuitry 840 and 842, transmit buffer address table 870, receive buffer address table 872, receive command FIFO 852 with receive execution queue 862, and transmit command FIFO 850 with transmit execution queue 860.

Bus master controller 800 supports three modes of operation: programmed I/O (PIO), packet descriptor list (PDL), and packet descriptor command (PDC). The PDC mode is also known as PROPULSION(tm) technology. Bus master controller 800 decodes and controls transactions and routing of data required by the operating modes. As a shorthand for references to the address of a PDL, the term PDA is used throughout the remainder of the text.

Command execution queues 860 and 862 are used in the PDL and PDC modes of operation to hold either a packet descriptor address or a packet descriptor command. A PDA provides the address where a corresponding packet descriptor list is obtained, while a PDC is used to execute a PROPULSION(tm) transaction. The command execution queue contains the loaded PDL and/or PDC instructions from the command FIFO. The PDL and PDC commands are executed from the command execution queues.

Packet descriptor lists are the data structures used to communicate information about transmit and receive packets. Both transmit and receive PDLs use the same format, shown in FIG. 2. Each PDL contains a packet descriptor header and one or more fragment descriptors describing the location and length of the packet data in host memory. In the case of a transmit PDL, the PDL describes the location and length of fragments that comprise the total packet. Packet length field 220 includes the sum of the length fields in the fragment descriptors. For receive PDLs, the length field is also the sum of the fragment lengths, however this field is overwritten with the actual length of the packet after the packet is received. When transferring a received packet from receive buffer 835 to host memory 180, bus master controller 800 scatters the packet across the locations described by each fragment descriptor. Note that the fragment lengths are not overwritten, so the last fragment transferred may contain less data than is indicated by the corresponding fragment length field. The header length field also indicates how many fragments are completely filled and how much data is in the last fragment. If the buffer described by the receive PDL is not large enough to hold the complete packet, a receive overflow error is generated and the remaining data is discarded.

Transmit execution queue 860 and receive execution queue 862 are independent FIFOs containing 32 and 64 entries, respectively, in a preferred embodiment. They contain either a PDA or a PDC instructions.

By writing a PDA or PDC to either a transmit command FIFO 850 or receive command FIFO 852, the host software transfers control of the buffer to bus master controller 800. Each time the host computer system 190 writes a PDA or PDC to a command FIFO, the FIFO's command count register is incremented. After bus master controller 800 has processed the PDL pointed to by a PDA or the PDC, the PDA or the PDC is removed from the ring and the command count register is decremented.

The host software uses a command FIFO count register to determine how many PDA or PDC commands are currently owned by bus master controller 800. If the host is capable of writing commands, and thereby transferring control of the PDL/PDC to bus master controller 800, faster than bus master controller 800 uses the PDLs or PDCs, efficient pipelining of packets occurs and bus transactions overlap with network transactions. Because of the large size of FIFOs 850 and 852, some of the bursty nature of bus accesses can be smoothed out.

Bus master controller 800 uses command execution queues 860 and 862 as scratch memory while transferring packet data between host memory 180 and transmit and receive buffers 830 and 835. Bus master controller 800 copies the PDL pointed to by the PDA into a command FIFO in the corresponding command execution queue. Bus master controller 800 uses this PDL to program bus interface 820 with the location and length of each fragment to be transferred. Loading the complete PDL into scratch memory improves utilization of the interconnect bus 130 because, in most cases, the complete PDL can be transferred in one bus transaction. If bus master controller 800 were to read each fragment descriptor separately, performance would suffer because each fragment descriptor read would require a separate bus transaction including the associated arbitration latency.

Bus master controller 800 also uses command execution queues 860 and 862 to hold PDC instructions. PDC instructions are directly transferred from the command FIFO. PDCs are executed out of the command execution queues to maintain PDL/PDC ordering and to maximize the use of the command FIFO.

Receive and transmit PDC instructions use the same word format, shown in FIG. 3. The format contains buffer length 320, block index 310, and options field 300. Block index 310 is an address into the corresponding buffer address table which contains the physical address at which data is to be transferred to or from the host memory. Buffer length field 320 specifies the number of bytes to be transferred during transmit operations, or the allocated host memory space required for a receive operation. If the packet data for a receive operation is larger than the allocated host memory space, bus master controller 800 fills the allocated space, sets a receive overflow flag, and then discards the remaining amount of the packet. Options field 300 is used to communicate special processing options to bus master controller 800, such as whether or not an interrupt is desired immediately upon the completion of a data transfer between controller 100 and host computer system 190.

Bus master state machine 810 coordinates and controls all activity associated with transferring packet data between host memory 180 and transmit and receive buffers 830 and 835 during PDL and PDC modes. Transmit and receive operations are independently described. However, they are actually performed by the same state machine 810 and are interleaved as necessary. Bus master state machine 810 can be configured to give priority to a receive operation. If data reception is occurring fast enough, it will perform up to eight receive cycles for each transmit cycle.

A transmit PDL transaction is generated by the host software, which creates a PDL describing the packet in host memory, and transfers control to bus master controller 800 by writing the PDL Address (PDA) to transmit command FIFO 850. Writing the PDA to transmit command FIFO 850 causes the transmit command count register to increment. When the command count register is greater than zero, bus master controller 800 extracts the next command from the FIFO. Since every PDL must have at least one fragment, bus master controller 800 programs bus interface 820 to read the PDL header and one fragment into transmit execution queue 860. If there is more than one fragment, bus master controller 800 reads the header to determine this fact and adjusts the number of fragments to be transferred to the execution queue. Once the complete PDL has been copied into the command execution queue, that PDA is discarded.

Because the PDL header has the total length of the packet data, bus master controller 800 checks transmit buffer 830 to ensure there is enough room to load another packet. If there is not enough room, bus master controller 800 waits until transmit buffer 830 has enough room for a new packet.

Bus master controller 800 then proceeds to interpret each fragment descriptor and programs bus interface 820 to copy each fragment from host memory 180 to transmit buffer 830. When all fragments have been copied to transmit buffer 830, bus master controller 800 discards the PDL and checks the command queue to determine if another PDL is available. If so, bus master controller 800 executes the new PDL and repeats the operation described above.

The operation of bus master controller 800 during receive transfers is similar to the transmit case with a few subtle differences. The host software creates a receive PDL, which describes the buffer in which to transfer the received data. A corresponding PDA is then written to receive command FIFO 852, transferring control to bus master controller 800. Bus master controller 800 transfers the PDL into receive execution queue 862, even if no received packets are available in the receive data buffers. By transferring the PDL before it is actually needed, bus master controller 800 attempts to reduce the latency between receiving a packet and transferring it to host memory.

This procedure repeats until: 1) a receive packet is available or 2) receive execution queue 862 is full. Even with receive execution queue 862 full, receive command FIFO 852 can load PDA/PDC instructions in advance to further reduce transaction latency.

When a complete packet is available in receive buffer 835, bus master controller 800 uses the preloaded PDL to determine how to scatter the received packet into host memory 180. Bus master controller 800 programs the necessary transactions into bus interface 820 to copy each fragment of the received packet into host memory 180 as described by the PDL fragment descriptors.

The first word of the received packet in receive buffer 835 contains the total packet length and the receive status. This word is saved by bus master controller 800 and is transferred to the receive PDL in host memory 180 after all packet data has been copied to host memory 180. The receive status field of the PDL becoming non-zero indicates that bus master controller 800 has transferred control of the buffer and associated PDL back to host computer system 190. This process is repeated until all received packets have been transferred or the PDA receive command FIFO is exhausted.

Transmit PDC mode provides increased performance by reducing the number of bus acquisitions required. This mode requires that physical addresses of preallocated buffers be loaded into transmit buffer address table 870 during system initialization. An operation starts with the host software gathering data fragments into a predefined contiguous memory space in one of the preallocated buffers. Once this is complete, the information needed for a PDC instruction is known. The PDC instruction is then created and transferred to the transmit command FIFO 850, and the command count register is incremented. If an instruction is at the beginning of transmit command FIFO 850, it is transferred to transmit execution queue 860. The command FIFO count is then decremented and the execution queue count is incremented. If the execution queue count is non-zero, control passes to bus master controller 800, which begins execution of the instruction. Bus master controller 800 decodes the instruction for the length and base index information while checking the transmit buffer flags for available packet space. With the proper information and status, bus master controller 800 configures bus interface 820 to commence transfer to the data buffer. Once the transfer is complete, the PDC instruction is discarded, the command queue count is decremented, and a complete transfer flag is set.

A receive PDC transaction is initiated by the receive buffer 835. Prior to the data transfer, receive buffer address table 872, receive execution queue 862, and receive command FIFO 852 are preloaded. With all of this information loaded in advance, the data transfer occurs with minimal overhead. This information can also be reloaded during period of non-use, or when empty, to better distribute the workload over time.

When receive buffer 835 indicates a packet has been received from high speed network 160, control is transferred to bus master controller 800. Bus master controller 800 accesses the PDC instruction on top of receive command execution queue 862, and examines the block index and length. Bus master controller 800 uses this information to program bus interface 820 to request a bus transaction. At the same time, bus master controller 800 determines if the initial data packet will fit in the allocated memory space. If the data packet will not fit, bus master controller 800 sends data until the host memory space is filled, sets the receive overflow flag, and signals receive buffer 835 to discard the remaining portion of the data packet. If the memory space is greater than one packet, bus master controller 800 determines if another packet can be transferred, and sends additional packets until the allocated memory space is filled. If the memory space allocated is greater in size than a bus transaction can deliver in one transaction, bus master controller 800 breaks the transfer into multiple transactions. Once the transfer is complete, the command execution count is decremented and another command is loaded. If another packet is ready in receive buffer 835, this cycle is repeated.

The simplest form of transmit occurs during programmed I/O (PIO) mode (PIO) transfers. This mode requires, very little or no action from bus master controller 800. PIO transfers one double word (32 bits) of data at a time directly to transmit buffer 830. Each transfer requires a separate request for interconnect bus 130, thus increasing total bus acquisition latency. Bus master controller 800 is only responsible for routing data to transmit buffer 830. The host software makes certain that packet space is available, and indicates to transmit buffer 830 that the packet transfer is complete by setting appropriate flags.

A receive PIO transfer is initiated by the host software. The host software ensures that a packet is available prior to transferring the packet to host computer system 190. Double word transfers are performed across interconnect bus 130 until all packet data has been transferred. The host software is also responsible for maintaining packet and data integrity.

The packet transfer process minimizes the number of interrupts necessary to interact with bus master controller 800. In many cases, host computer system 190 receives and transfers packets without ever taking an interrupt. The host software can program bus master controller 800 to generate an interrupt in the following cases: after each packet has been transferred to the transmit buffer 830; when the transmit command FIFO is exhausted; or upon any transmit error. Receive interrupts are generated after each receive packet has been transferred to host memory 180, when the receive command FIFO 852 is exhausted, or when receive errors occurs.

In one embodiment, bus master controller 800 implements a "lying send" transmit policy in which a successful packet transmission is signaled to the host software as soon as possible after bus master controller 800 completes the data transfer between host memory 180 and transmit buffer 830 or receive buffer 835. The packet is considered to be "transmitted" the moment bus master controller 800 has a complete copy of the packet. It is the responsibility of protocols above the driver level to ensure that packets are successfully transmitted to remote stations. If a packet is lost during transmission by bus master controller 800, the protocol must recognize that the packet is lost and take a corrective action, such as a retransmission.

Errors such as CRC, runt packet and long packet errors are detected by bus master controller 800 and signaled to the host software by specific bits in the receive PDL header. The header also contains additional information bits pertaining to the inbound packet.

Padding of packets that are shorter than the minimum legal length for transmission is the responsibility of software on host computer system 190.

Bus master controller 800 supports the use of PDL and PDC data transfer methods simultaneously. When transferring data, software on host computer system 190 indicates the required transfer method by placing an appropriate command in transmit command FIFO 850 or receive command FIFO 852. For packet transmission using the PDC data transfer method, software on host computer system 190 initiates the process by writing a PDC to the appropriate command FIFO. If host computer system 190 wishes to transmit a packet using conventional bus master DMA, it writes a PDA to the command FIFO instead.

From the perspective of host computer system 190, intermixing PDC and PDL data transfer methods can be accomplished with just one index variable for the PDC queue, one for the PDL queue and a counter variable reflecting the free space in transmit command FIFO 850. This technique works as long as each queue accommodates at least as many entries as transmit command FIFO 850. Mathematically, we say that CMD=# of entries that can be accommodated in the command FIFO PDL=# of entries that can be accommodated in the PDL queue PDC=# of entries that can be accommodated in the PDC queue FREE=# of unused entries in the command FIFO

CMD=PDL=PDC

CMD=FREE+$PDL_{used}$+$PDC_{used}$

The PDL and PDC variables with the "used" subscript indicate the entries in the respective rings that contain transmit requests.

The system guarantees the relationship of used PDC/PDL entries to the total number of command FIFO entries with a free count variable. Initially, the counter is set to the size of the command FIFO. Each time a transmit request is submitted to bus master controller 800, the command FIFO free count is decremented.

When the counter reaches zero, the host software reloads the counter from a bus master status register, thereby obtaining the most recent free count. Since the system guarantees the relationship in the above equation, we see that FREE=CMD−$PDL_{used}$−$PDC_{used}$.

Figure 9:
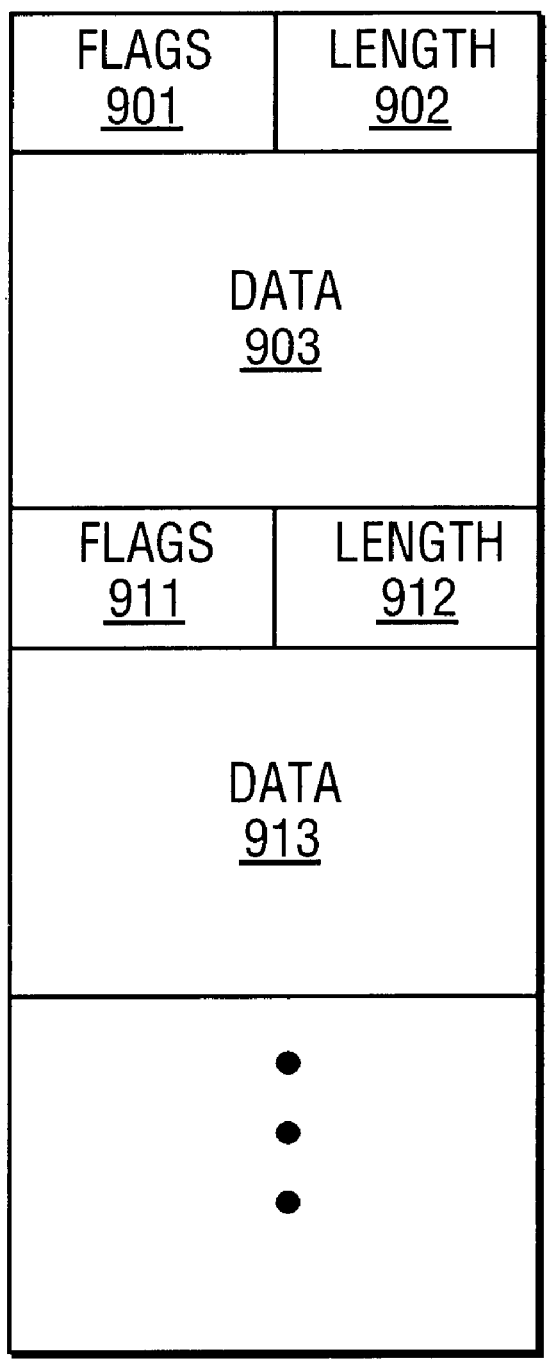
FIG. 9 is a block diagram illustrating the structure of a preallocated buffer, including a plurality of packets for transmission to a NIC, in accordance with an aspect of the present invention.

FIG. 9 is a diagram illustrating two packets packed into a single preallocated buffer within memory 180 in accordance with an aspect of the present invention. FIG. 9 includes a first packet, including flags 901 and length 902. Flags 901 contain status information for the first packet. Length field 902 contains the length of the first packet. The first packet also includes data 903, which contains all of the data associated with the packet. The second packet includes flags 911 and length 912. Flags 911 contain status information for the second packet. Length field 912 contains the length of the second packet. The second packet also includes data 913, which is the data associated with the second packet. As indicated by the ellipsis, additional packets may be included into a single preallocated buffer.

The foregoing description of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. An apparatus comprising:

a bus interface, coupled to a bus of a computer system, to communicate with the computer system;

a transmit buffer, coupled to the bus interface, to store data to be transmitted from the computer system to a data network;

a receive buffer, coupled to the bus interface, to store data received from the data network for the computer system;

a network interface controller, coupling the receive buffer and the transmit buffer to the data network;

a buffer address table, coupled to the bus interface, to pre-store a plurality of translated physical addresses of a plurality of buffers pre-allocated in memory of the computer system, wherein memory locations are normally referenced with virtual addresses; and a controller, coupled to the transmit buffer, the receive buffer and the buffer address table, to receive from the computer system data transfer commands that include indices indexing the physical addresses pre-stored in the buffer address table, and in response, controlling transfer of data from the computer system to the transmit buffer, or from the receive buffer to the computer system, through corresponding ones of the pre-allocated buffers using the indexed physical addresses.

2. The apparatus of claim 1, including a transmit command queue coupled to the bus interface and the controller, to store transmitted ones of said data transfer commands from the computer system, each including, a buffer index field to index one of the physical addresses pre-stored in the buffer address table; and a packet length field indicating the length of a packet of data to be transferred from the a corresponding one of the pre-allocated buffers to the transmit buffer, using the indexed physical address.

3. The apparatus of claim 1, including a receive command queue coupled to the bus interface and the controller, to store receive ones of said data transfer commands from the computer system, each including, a buffer index field indexing one of the physical addresses pre-stored in the buffer address table;

a packet length field indicating the length of a packed to data to be transferred from the receive buffer to a corresponding pre-allocated buffer, using the indexed physical address.

4. The apparatus of claim 1, including:

a transmit command queue coupled to the bus interface and the controller, to store transmitted ones of said data transfer commands from the computer system; and a transmit execution queue coupled to the bus interface, the controller and the transmit command queue, to store the transmitted commands from the transmit command queue, and command blocks from the computer system which are referenced by the transmit commands from the transmit command queue.

5. The apparatus of claim 1, including:

a receive command queue coupled to the bus interface and the controller, to store received ones of said data transfer commands from the computer system; and a receive execution queue coupled to the bus interface, the controller and the receive command queue, to store the received commands from the receive command queue and command blocks from the computer system which are referenced by the received commands from the receive command queue.

6. The apparatus of claim 1, wherein the buffer address table includes:

a transmit buffer address table for storing a transmit subset of said physical addresses of a transmit subset of said buffers in the memory of the computer system, the transmitted subset of said buffers being pre-allocated by the computer system and used to store data in transit between the computer system and the transmit buffer; and a receive buffer address table to store a receive subset of said physical addresses of a received subset of said buffers in the memory of the computer system, the received subset of said buffers being pre-allocated by the computer system and used to store data in transit between the receive buffer and the computer system.

7. The apparatus of claim 1, wherein the controller includes a mechanism to transfer a plurality of packets in a single operation between a plurality of said buffers preallocated by the computer system and the transmit buffer.

8. The apparatus of claim 1, wherein the controller includes a mechanism to transfer a plurality of packets in a single operation between the receive buffer and a plurality of said buffers pre-allocated by the computer system.

9. The apparatus of claim 1, wherein the apparatus is implemented on a single silicon chip.

10. The apparatus of claim 1, wherein the bus includes a PCI bus.

11. A method comprising:
pre-allocating a plurality of buffers in memory of a computer system, wherein memory locations are normally addressed with virtual addresses;
determining physical addresses of the pre-allocated buffers;
pre-storing in a network interface device the physical addresses of the pre-allocated buffers;
providing a command from the computer system to the network interface device, the command indicating that a transfer between the network interface device and the computer system is to take place, and including an index indexing one of said pre-stored physical addresses; and
the network interface device effectuating said indicated transfer through a selected one of said pre-allocated buffers corresponding to said indexed physical address.

12. The method of claim 11, wherein the command received further includes a length field indicating an amount of data to be transferred between the network interface device and the corresponding pre-allocated buffer of the indexed physical address, and the network interface device further effectuates said indicated transfer using the included length.

13. The method of claim 11, wherein said indicated transfer comprises transferring a plurality of packets in a single operation from the network interface device to the corresponding pre-allocated buffer of the indexed physical address.

14. The method of claim 11, wherein said indicated transfer comprises transferring a plurality of packets in a single operation from the corresponding pre-allocated buffer of the indexed physical address to the network interface device.

15. A method comprising:
pre-allocating a plurality of buffers in memory of a computer system, where memory locations are normally addressed with virtual addresses;
determining physical addresses of the pre-allocated buffers;
transmitting to an interface device the physical addresses of the pre-allocated buffers, for pre-storage by the interface device; and
transmitting a data transfer command from the computer system to the interface device, the command indicating a data transfer to be performed between the interface device and the computer system and including an index indexing one of said physical addresses corresponding to one of the pre-allocated buffers to be used for the data transfer.

16. The method of claim 15, wherein the data transfer command transmitted to the interface device further includes a length field indicating an amount of data to be transferred between the interface device and the pre-allocated buffer to be used.

17. An apparatus comprising:
a pre-allocated buffer in a computer system, the pre-allocated buffer having a memory location normally referenced with a virtual address;
a bus interface, coupled to a bus of the computer system, to communicate with the computer system;
a data transfer buffer, coupled to the bus interface, to buffer data transferred between the computer system and a network interface device coupled to the computer system;
a buffer address table, coupled to the bus interface, to hold a translated physical address of the memory location of the pre-allocated buffer, the translated physical address having been pre-loaded into the buffer address table by the computer system;
a command execution queue, coupled to the bus interface, to hold a command to transfer a packet of data between the pre-allocated buffer and the data transfer buffer, the command having been pre-loaded into the command execution queue by the computer system; and
a controller, coupled to the command execution queue and the buffer address table, to execute the command to transfer the packet of data between the pre-allocated buffer and the data transfer buffer using the translated physical address in the buffer address table.

18. The apparatus of claim 17, wherein the command to transfer the packet of data comprises an index to the translated physical address in the buffer address table and a length of the preallocated buffer, and wherein execution of the command causes the controller to transfer a portion of the packet of data having the length of the pre-allocated buffer using the indexed translated physical address.

19. The apparatus of claim 18, wherein the command to transfer the packet of data further comprises an option field to communicate to the controller an action to take after executing the command.

20. The apparatus of claim 19, wherein the action is to trigger an interrupt immediately upon completion of the transfer of the packet of data between the pre-allocated buffer and the data transfer buffer.

21. The apparatus of claim 17, wherein the command to transfer the packet of data is a transmit command causing the controller to transfer the packet of data from the pre-allocated buffer to the data transfer buffer.

22. The apparatus of claim 17, wherein the command to transfer the packet of data is a receive command causing the controller to transfer the packet of data from the data transfer buffer to the pre-allocated buffer.

23. The apparatus of claim 17, wherein the command to transfer the packet of data comprises an address to a list comprising a header and at least a one fragment descriptor describing a location and a length of a fragment of the packet of data, and wherein execution of the command causes the controller to transfer the fragment of the packet data having the location and length as described in the fragment descriptor in the list.

24. The apparatus of claim 21, wherein the list header further comprises a header length, the header length describing how many fragments are in the packet of data, and a last fragment length, the last fragment length describing a length of the last fragment of the packet of data, and wherein execution of the command causes the controller to transfer the last fragment of the packet data having the last fragment length as described in the header length of the list.

25. A method for transferring data between a computer system and a network interface device comprising:

receiving a command from a command execution queue, the command having been pre-loaded into the command execution queue by the computer system, wherein the command includes instructions to transfer a packet of data between a pre-allocated buffer in the computer system and a data transfer buffer coupled to the network interface device;

obtaining a translated physical address of a memory location of the pre-allocated buffer from a buffer address table, the translated physical address having been pre-loaded into the buffer address table by the computer system;

executing the command to transfer the packet of data between the pre-allocated buffer and the data transfer buffer using the translated physical address in the buffer address table.

26. The method of claim 25, wherein the command to transfer the packet of data comprises an index to the translated physical address in the buffer address table and a length of the pre-allocated buffer, and wherein execution of the command causes the controller to transfer a portion of the packet of data having the length of the pre-allocated buffer using the indexed translated physical address.

27. The method of claim 26, wherein the command to transfer the packet of data further comprises an option field to communicate to the controller an action to take after executing the command.

28. The method of claim 27, wherein the action is to trigger an interrupt immediately upon completion of the transfer of the packet of data between the pre-allocated buffer and the data transfer buffer.

29. The method of claim 25, wherein the command to transfer the packet of data is a transmit command causing the controller to transfer the packet of data from the pre-allocated buffer to the data transfer buffer.

30. The method of claim 25, wherein the command to transfer the packet of data is a receive command causing the controller to transfer the packet of data from the data transfer buffer to the pre-allocated buffer.

* * * * *